United States Patent [19]

Stegehuis

[11] Patent Number: 5,270,925

[45] Date of Patent: Dec. 14, 1993

[54] METHOD OF AND DEVICE FOR CORRECTING SCATTERED-RADIATION EFFECTS IN X-RAY IMAGES

[75] Inventor: Herman Stegehuis, Eindhoven, Netherlands

[73] Assignee: U.S. Philips Corporation, New York, N.Y.

[21] Appl. No.: 397,157

[22] Filed: Aug. 21, 1989

[30] Foreign Application Priority Data

Sep. 5, 1988 [NL] Netherlands ................ 8802184

[51] Int. Cl.⁵ ........................................ G06F 15/00
[52] U.S. Cl. .................................................. 364/413.17
[58] Field of Search ................ 364/413.17, 413.13, 364/413.16

[56] References Cited

U.S. PATENT DOCUMENTS

| | | | |
|---|---|---|---|
| 4,135,247 | 1/1979 | Gordon et al. | 364/413.16 |
| 4,138,611 | 2/1979 | Hounsfield | 364/413.17 |
| 4,274,140 | 6/1981 | Watson | 364/413.17 |
| 4,275,444 | 6/1981 | Ryan | 364/413.17 |
| 4,727,562 | 2/1988 | Belanger | 378/99 |
| 4,809,172 | 2/1989 | Hopkinson et al. | 364/413.16 |

OTHER PUBLICATIONS

"X-ray Image Intensifier and System Employing it", Patent Abstracts of Japan vol. 11, No. 187 (E-516) Jun. 16, 1987.

Naimuddin, Hasegawa, & Mistretta, "Scatter-glare Correction Using A Convolution Algorithm with Variable Weighting", Medical Physics, vol. 14, No. 3, May/Jun. 1987, pp. 330-334.

Patent Abstracts of Japan, vol. 10, No. 95 (E-395) [2125], Apr. 12, 1986, p. 87 E 395.

Primary Examiner—Roy N. Envall, Jr.
Assistant Examiner—Laura Brutman
Attorney, Agent, or Firm—Jack D. Slobod

[57] ABSTRACT

Scattered radiation in an X-ray image causes a reduction of contrast. An estimate of the scattered radiation contribution is obtained by means of a version of the original image which is spread-out in space and which is multiplied by a location-dependent weighting factor. By subtracting this scattered radiation image from the X-ray image, a corrected image with enhanced contrast is obtained. The estimate of the scattered radiation image is adapted to the adjustment values for the imaging parameters of the X-ray system.

11 Claims, 2 Drawing Sheets

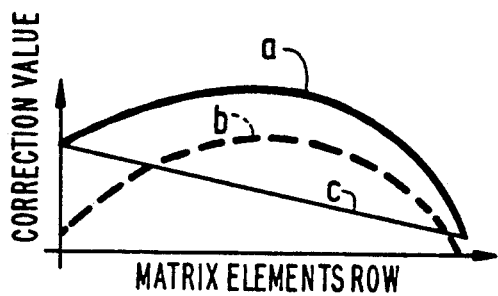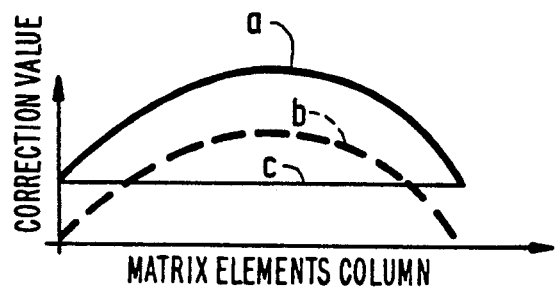
FIG. 3a    FIG. 3b
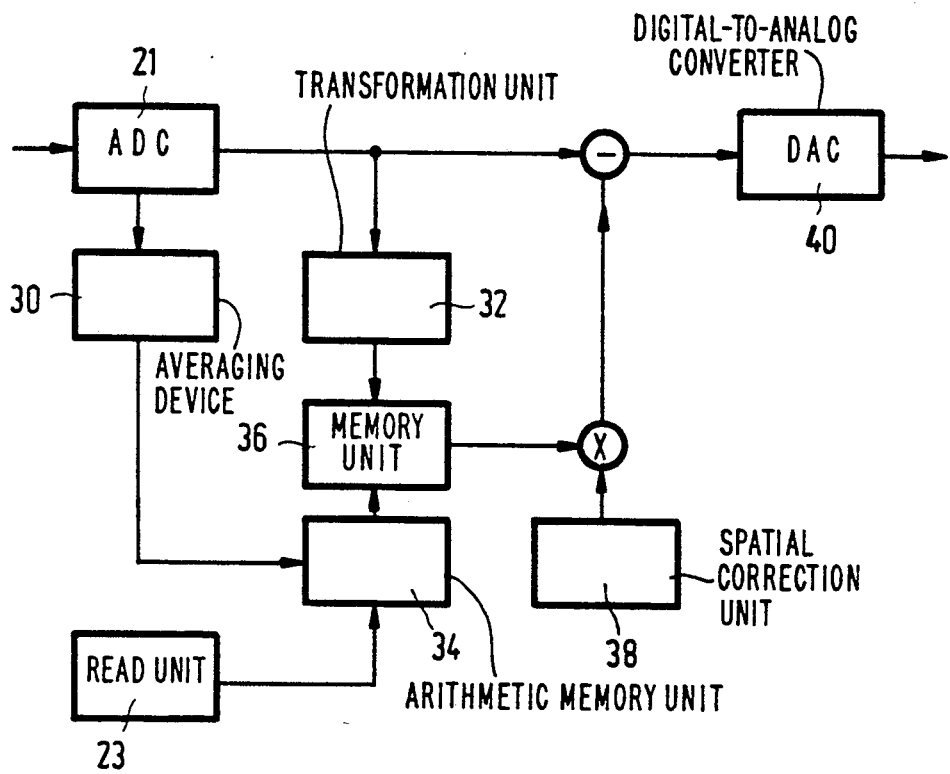
FIG. 4

METHOD OF AND DEVICE FOR CORRECTING SCATTERED-RADIATION EFFECTS IN X-RAY IMAGES

FIELD OF THE INVENTION

The invention relates to a method of correcting scattered-radiation effects in an X-ray image where a digital image signal originating from an X-ray system is converted into an image matrix of intensity values which are transformed, into a transformed image matrix, by convolution of the image signal with a point spread function, a scatter image matrix being formed by multiplication of each matrix element of the transformed image matrix by a weighting factor, a corrected image matrix being formed by substracting matrix elements of the scatter image matrix from corresponding matrix elements of the image matrix.

The invention also relates to a device for correcting scattered radiation effects in an X-ray image, comprising an X-ray source, an X-ray detector for converting an image-carrying X-ray beam into a video signal, an analog-to-digital converter whose input signal is formed by the video signal and whose output signal is a digital image signal, a transformation device for forming an image matrix of intensity values from the digital image signal and for transforming the image matrix into a transformed image matrix by convolution with a point spread function, a memory device for determining a weighting factor which depends on a local intensity value, and a device for substracting the transformed image, weighted by weighting factors, from the image matrix.

BACKGROUND OF THE INVNENTION

A method of this kind is known from Med. Phys. Vol. 14, No. 3, May/June 1987, pp. 330-334.

This publication describes a method of processing an X-ray image by estimating a scattered radiation field from a spatial intensity distribution of an attenuated X-ray beam. This method serves to reconstruct a corrected image having a higher contrast by subtracting a scattered radiation image from the measured intensity distribution from an original image which has been "contaminated" by a non-imaging component which becomes apparent as blurring across the image. In the absence of scattered radiation, a linear relationship exists between a logarithm of intensity and the distance in a direction of irradiation. By correction for scattered radiation the quantitative accuracy increases in densitometry where relative thickness differences are calculated from an image. A spatial intensity distribution of an X-ray beam attenuated by an object contains a component which does not contribute to imaging, inter alia because in addition to attenuation of the X-ray beam in the propagation direction also scattering of electrons from the attenuating object occurs. The intensity distribution of the scattered X-rays can be described as a convolution of a primary incident beam with a so-called point spread function. The detected intensity is taken as an estimate for the primary intensity. Any practical image of an object is spatially spread by a point spread function. Because a ratio of scattered radiation to primary radiation behind a thick object when irradiated by an X-ray beam is higher than that behind a thin object, when estimating the scattered radiation from the primary beam, the convoluted primary beam must also be weighted by a weighting factor which depends on the local transmission. The accuracy of an estimate of the scattered radiation field is inter alia dependent on the accuracy with which the local weighting factor can be determined. In the cited publication the local weighting factor is measured with a fixed setting of a tube voltage of an X-ray tube and a fixed distance between focus and detector. In a correction circuit the local weighting factors are plotted in a table. Depending on an intensity value of an element in the image matrix of the detected X-ray image, a local weighting factor is selected whereby a corresponding matrix element of the convoluted image matrix is multiplied.

A method of this kind has the drawback that the local weighting factor is applicable only to one fixed adjustment value of the imaging parameters. When a tube voltage, a tube current, a position of the X-ray focus, the patient table, a distance between the patient and the image intensifier, an active cross-section of an entrance screen of an image intensifier, etc. is changed, a new variation of the local weighting factor must be measured. Furthermore, during determination of the local weighting factor from the detected image, which may contain abrupt transition in brightness, the weighting factors may vary comparatively greatly over a short distance in the image. This causes gradients in the estimated scattered radiation image; this is a poor approximation of an actual scattered radiation image which varies only slowly as a function of location.

SUMMARY OF THE INVENTION

It is an object of the invention to provide a method of correcting scattered radiation effects in an X-ray image which avoids the above drawbacks.

To achieve this, a method in accordance with the invention is characterized in that the selection of the weighting factor for an image element of the transformed image matrix is determined by an intensity value of the matrix element of the transformed image matrix.

The transformed image matrix is a spread version of the image matrix wherefrom comparatively high frequencies have been removed by averaging. When a weighting factor associated with an image element of the transformed image matrix is selected from a table containing pairs of numbers formed by intensity values of the transformed image matrix and associated weighting factor the spatial variation of the weighting factors is comparatively small.

A preferred version of a method in accordance with the invention is characterized in that a variation of the weighting factor as a function of the intensity is co-determined by adjustment values of imaging parameters of the X-ray system. Automatic adaptation of the weighting factor to the adjustment values of the imaging parameters eliminates the necessity to determine the weighting factor each time again.

A further preferred version of a method in accordance with the invention is characterized in that a vertical offset of the weighting factor as a function of the intensity varies linearly with a mean image intensity.

It is known that for a decreasing thickness of an irradiated object the weighting factor, presenting the local ratio of the intensity of the scattered radiation component to the convoluted primary intensity, decreases. A vertical offset of the variation of the weighting factor with the intensity is determined to a high degree by a "common" adjustment, and in the case of pulsed operation the pulse duration, of tube voltage and tube current of an X-ray tube, a distance between an object to be irradiated and an entrance screen of an X-ray detector, for example an X-ray image intensifier, the presence of a scattered radiation grid and the surface area of a detecting surface. The setting or pulse duration of the voltage and current of the X-ray tube depends on the thickness of the patient, the scattered radiation component also being dependent thereon. For tube voltages of between 50 kV and 70 kV and a distance of between 5 and 20 cm between the object to be irradiated and an entrance screen of an X-ray detector, the vertical offset can be described as a substantially linear function of the mean image intensity. The effect of variations of the image intensity around the mean image intensity on the vertical offset may be taken into account, if desired, as a higher-order effect. The presence of a scattered radiation grid has an effect on the vertical offset, which offset is higher in the absence of a scattered radiation grid. For an entrance screen of an X-ray detector having a comparatively small diameter and for the associated X-ray beam collimated to a narrow beam, the vertical offset is lower than for an entrance screen having a comparatively large diameter and the associated wider X-ray beam, because a narrow X-ray beam generates less scattered radiation.

When a homogeneous object having comparatively large transverse dimensions is irradiated, the weighting factor is not constant but varies across an image plane. This is due to a number of effects. A scattered radiation grid is usually more effective at the edges than in the center. However, a substantial contribution is made to the variation of the image brightness by the fact that a point at an edge of an image plane receives substantially less scattered radiation than a point which is situated nearer to the center of the image plane. Because of the beam geometry and the curvature of the entrance screen of the detector, the path travelled by the X-rays between an object to be examined and the X-ray detector is longer at the edges of the image than in the center of the image, so that the relative contribution of the scattered radiation is smaller at the edges than in the center. Due to the shape of an anode of an X-ray tube the intensity and the hardness of the radiation vary from one side of the image to another side (the so-called "heel effect"). Consequently, the relative contribution of the scattered radiation varies. By multiplication of the elements of the scatter image matrix by corresponding elements of the spatial correction matrix, image correction can be performed to reduce the image inhomogeneities thus caused.

A further preferred version of a method in accordance with the invention is characterized in that during convolution with the point spread function of an image section which is situated within a distance equal to one half width of the point spread function from an image edge of an image-carrying image, incorrect averaging of the image section is substantially compensated for by multiplication of elements of the scatter image matrix by corresponding elements of a spatial correction matrix.

Upon convolution of the image signal with the point spread function so that the intensity value in each image point is obtained by a weighted average with intensity values of neighboring image points, the image points which are situated within one half width of the point spread function from the image edge will obtain an incorrect value. This is because averaging takes place with image points which are situated outside the image edge and an intensity value of which can be given an arbitrary value. Using a spatial correction, these image points can be scaled to a correct means value. This can be realized, for example by convoluting an entirely white image with the point spread function and by taking the intensity values which are not equal to zero as the scale value. When the scatter image matrix is multiplied by a correction matrix formed by the inverse scale values, the edge points are scaled back again to their original mean value. The correction matrix can be included in the spatial correction matrix.

IN THE DRAWING:

Some versions of a method in accordance with the invention will be described in detail hereinafter with reference to the accompanying drawing; therein FIG. 1 shows an X-ray examination apparatus for performing the method of correcting scattered-radiation effects in an X-ray image, FIG. 2 shows the weighting factor as a function of the image intensity, FIGS. 3a and 3b show a spatial correction along two mutually perpendicular image lines, and FIG. 4 is a diagrammatic representation of a correction circuit.

DESCRIPTION OF THE PREFERRED EMBODIMENT

Figure 1:
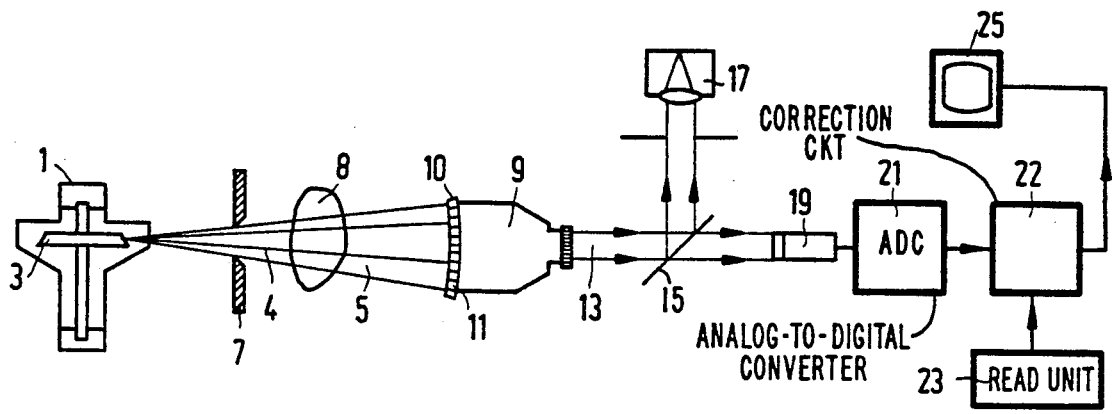

FIG. 1 shows an X-ray tube 1 comprising a rotary anode 3. The anode 3 emits an X-ray beam 5 which is collimated by a collimator 7 and which is detected by an X-ray image intensifier tube 9 after having irradiated an object 8. An entrance screen 11 of the X-ray image intensifier tube 9 comprises a scattered radiation grid 10 which intercepts a part of the X-rays having a propagation direction which deviates from that of the direction of irradiation. In the X-ray image intensifier tube 9 an image-carrying X-ray beam 5 is converted into an image-carrying light beam 13. A semi-transparent mirror splits the light beam 13 into a part which is imaged on a photographic film by a photo camera 17, and a part which is converted into a video signal by a television camera device 19. The video signal is digitized by an analog-to-digital converter ADC 21; in a correction circuit 22 the video signal is corrected so as to eliminate the scattered radiation effects from the X-ray image. The correction circuit 22 receives adjustment values for image parameters from a read unit 23, for example voltage and current of the X-ray tube 1 and the distance between the object 8 and the entrance screen 11, etc. The corrected image signal can be displayed on a television monitor 25.

Figure 2:
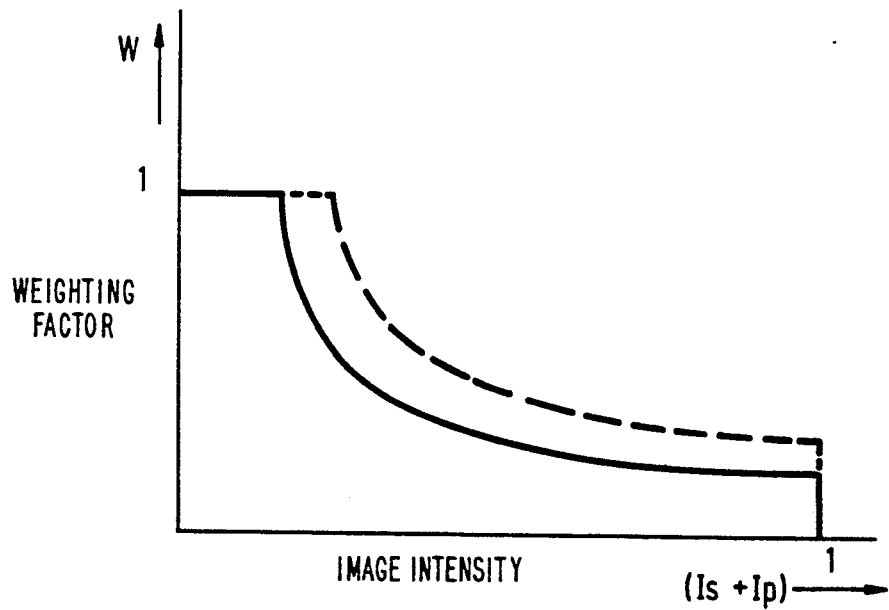

FIG. 2 shows the variation of the weighting factor as a function of the image intensity. The vertical offset of the curve is co-determined by the thickness of the object 8 for which the adjustment values of current and voltage of the X-ray tube 1 are a measure. The weighting factor as a function of intensity is given by a monotonously descending function across an image width, region d, for intensities higher than intensity $I_o$. The vertical offset of the function varies linearly with a mean image intensity.

FIG. 3a shows a curve a which represents the distribution the correction values for a row of matrix elements of the spatial correction matrix. The scattered radiation makes a largest contribution near the center of this row and its effect decreases in the direction of the edges in accordance with the curve b. Because of the "heel" effect the correction values are represented by the superposition of a curve b and a curve c, with a distribution which decreases from one image edge to an oppositely situated image edge.

FIG. 3b shows the distribution of the correction values for a column of matrix elements of the spatial correction matrix. The heel effect varies in only one direction and is constant for columns of the correction matrix (curve c).

FIG. 4 shows the ADC 21 in which a video signal is digitized. In an averaging device 30 a mean image intensity is determined which is used, together with adjustment values of the imaging parameters and the system variables which originate from a read unit 23, to generate a weighting factor function in an arithmetic and memory unit 34. In a memory unit 36 pairs of numbers, formed by total intensity values and the associated intensity value of the scattered radiation, are stored in the form of a table. For each element of the transformed image matrix determined in the transformation unit 32 there is determined a scattered radiation intensity. After multiplication of the elements of the scattered image matrix by corresponding elements of a spatial correction matrix in a spatial correction unit 38, the corrected image matrix is subtracted from the original image matrix. The corrected image signal can be converted into an analog signal by a DAC 40 for display on a television monitor. Incorrect averaging of an image section within a distance that is one half width of the point spread function from an image edge is substantially compensated for by the multiplication of elements of the scatter image matrix by corresponding elements of the spatial correction matrix.

What is claimed is:

1. A method for correcting for the spread of radiation effects from a point in an object in an image produced from said radiation, said method comprising:
    causing object penetrating radiation of a given wavelength to be present in said object, said radiation exiting from the object and manifesting said spread;
    detecting the radiation exiting from the object;
    generating a digital image signal in response to said detecting;
    converting the digital image signal into a first image matrix of intensity values;
    transforming the first image matrix into a second matrix by convolution of the first matrix with a point spread function;
    determining a weighting factor for each image element of the second matrix in accordance with the intensity value of that matrix element of the second matrix;
    forming the second matrix into a third image matrix by multiplication of each matrix element by the corresponding weighting factor; and
    subtracting the value of the matrix elements of the third image matrix from the value of the corresponding matrix elements of the first matrix.

2. The method of claim 1 wherein said determining said weighting factor includes co-determining said weighting factor as a function of intensity with adjustment values of imaging parameters in an X-ray system.

3. The method of claim 1 wherein said determining said weighting factor includes determining a weighting factor which descends monotonously as a function of intensity for intensities higher than a given intensity $I_o$ and wherein a given value of the weighting factor varies linearly with a mean image intensity.

4. The method as claimed in any one of claims 1, 2 and 3 wherein said forming the second matrix includes multiplying the elements of the scatter image matrix by corresponding elements of a spatial correction matrix.

5. The method as claimed in claim 4 wherein the spatial matrix has rows and columns, the method including causing the matrix elements in a row of the spatial correction matrix to exhibit an intensity value distribution which is formed by a function which monotonously descends across an image width and which is superposed on an intensity value distribution which is smaller at the image edges than in the image center and causing the matrix elements in a column of the spatial correction matrix to exhibit an intensity value distribution which is smaller at the edges of the image than at the center of the image.

6. A method as claimed in claim 4 wherein said convolution with the point spread function of an image section includes convoluting the image section situated within a distance equal to one half width of the point spread function from an image edge of an image-carrying image to substantially compensate for incorrect averaging of said image section by said multiplication of elements of the scatter image matrix by said corresponding elements of said spatial correction matrix.

7. An apparatus for correcting scattered radiation effects in an X-ray image comprising:
    an X-ray source for generating an X-ray beam;
    an X-ray detector responsive to said beam for converting an image manifested by said X-ray beam into a video signal;
    analog-to-digital converter means for producing a digital output signal from said video signal applied as an input thereto;
    transformation means responsive to the digital signal for forming a first image matrix of a plurality of intensity values from the digital image signal and for transforming the image matrix into a transformed second image matrix by convolution with a point spread function;
    memory means responsive to the transformed second image matrix for storing a weighting factor for each element which factor depends on the local intensity value of said converted image;
    averaging means responsive to said digital output signal for providing a signal manifesting the mean image intensity from said output signal;
    arithmetic means responsive to said mean image intensity signal for forming a table containing pairs of numbers of intensity and associated weighting factor for each element of the transformed image matrix, the selection of a weighting factor for an element being under control of an intensity value of the corresponding element of the transformed image matrix, said arithmetic means including means for storing said table in said memory means; and
    means for subtracting the transformed second image matrix, weighted by said selected weighting factors, from the first image matrix.

8. The apparatus for correcting scattered radiation effects in an x-ray image as claimed in claim 7 including means for generating an input signal for said arithmetic means, said input-signal manifesting adjustment values for the imaging parameters of said beam in order to calculate said weighting factors.

9. The apparatus for correcting for radiation effects in an image as claimed in any one of claims 8, 7 or 10 wherein said means for subtracting comprises means for multiplying the elements of the transformed image matrix by corresponding matrix elements of a spatial correction matrix.

10. An apparatus for correcting for the spread of radiation effects from a point in an object in an image produced from said radiation, said apparatus comprising:

means for causing object penetrating radiation of a given wavelength to be present in said object, said radiation exiting from the object and manifesting said spread;

means for detecting the radiation exiting from the object;

means for generating a digital image signal in response to said detecting;

means for converting the digital image signal into a first image matrix of intensity values;

means for transforming the first image matrix into a second matrix by convolution of the first matrix with a point spread function;

means for determining a weighting factor for each image element of the second matrix in accordance with the intensity value of that matrix element of the second matrix;

means for forming the second matrix into a third image matrix by multiplication of each matrix element by the corresponding weighting factor; and means for subtracting the value of the matrix elements of the third image matrix from the value of the corresponding matrix elements of the first matrix.

11. The apparatus of claim 10 wherein said means for causing includes means for exposing said object to X-ray radiation.

* * * * *